June 26, 1962 R. P. GARRISON ET AL 3,041,079
CHUCK
Filed Jan. 6, 1960 3 Sheets-Sheet 1

INVENTORS
RALPH P. GARRISON, JAMES O. GARRISON
DAVID D. WALKER
BY Tom Walker
ATTORNEY

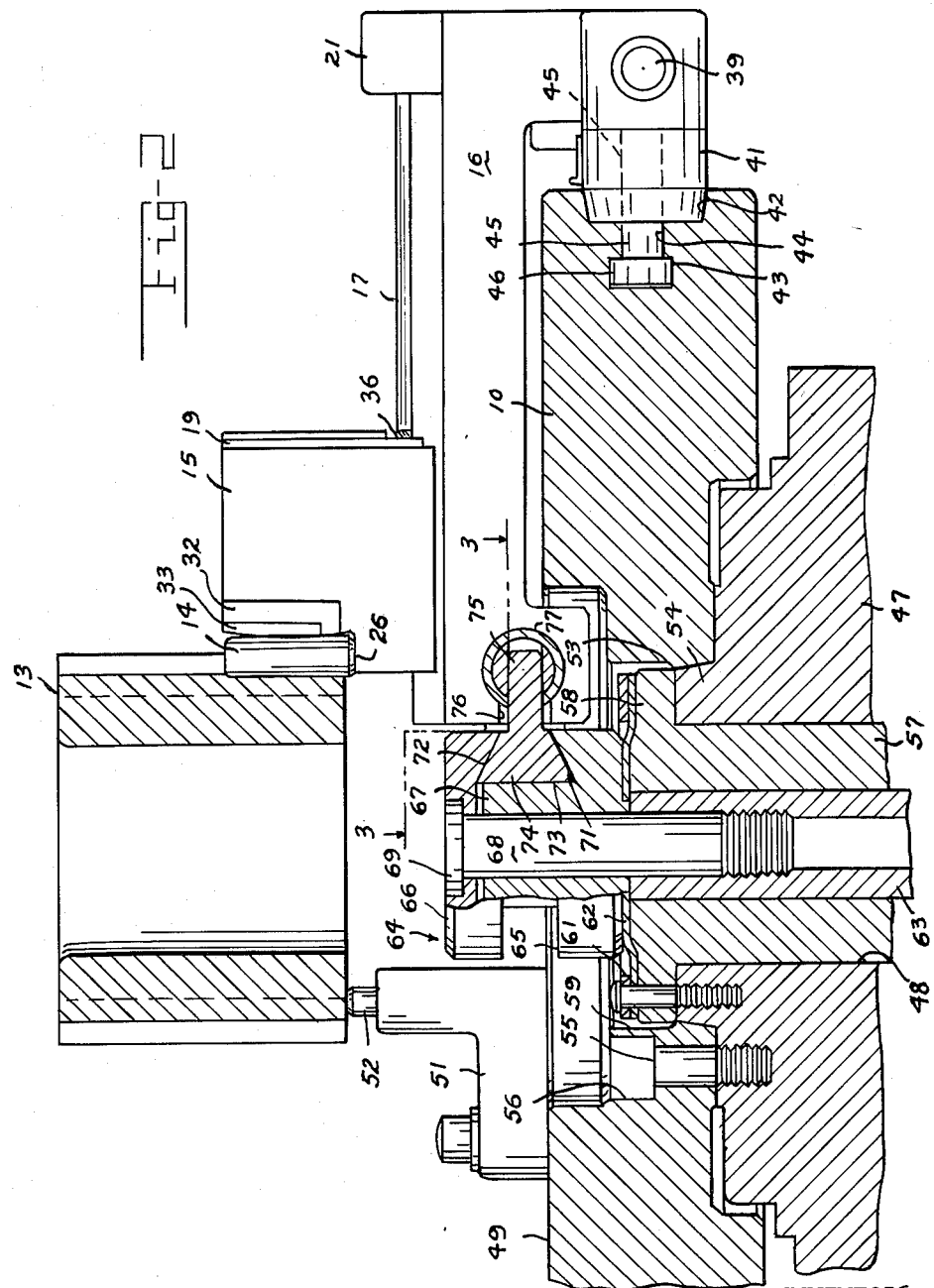

June 26, 1962 R. P. GARRISON ET AL 3,041,079
CHUCK
Filed Jan. 6, 1960 3 Sheets-Sheet 3
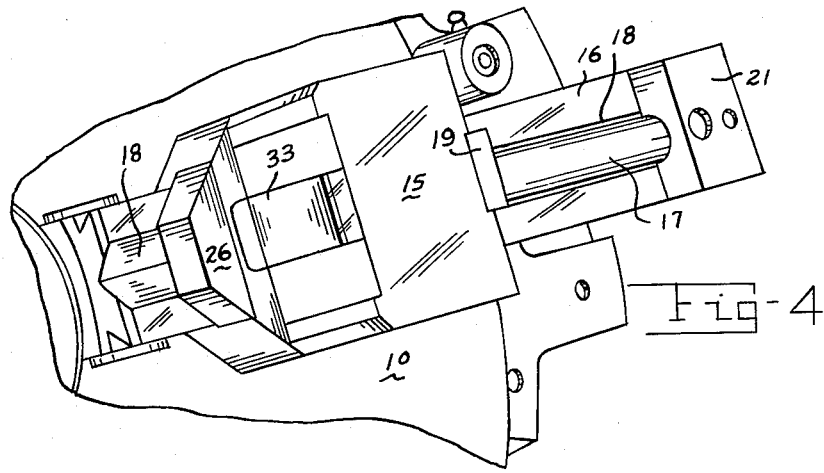
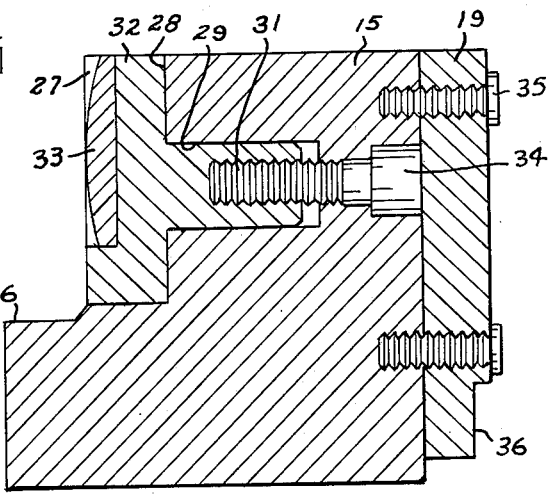
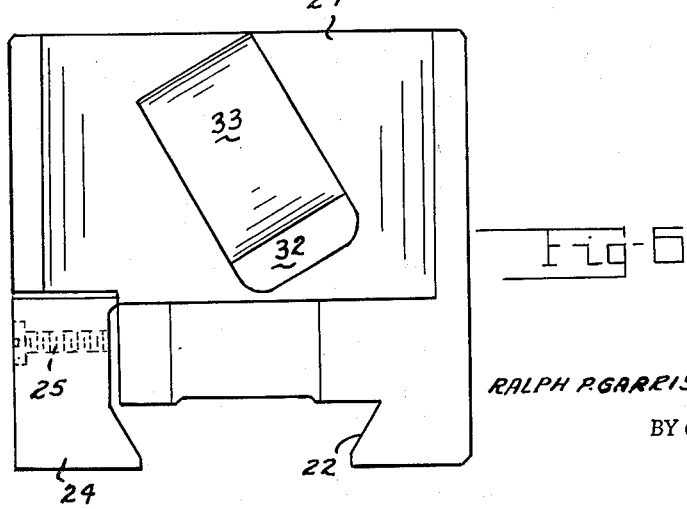
INVENTORS
RALPH P. GARRISON, JAMES O. GARRISON
DAVID D. WALKER
BY Tom Walker
ATTORNEY

United States Patent Office 3,041,079
Patented June 26, 1962

3,041,079
CHUCK
Ralph P. Garrison, deceased, late of Dayton, Ohio, by Katharine S. Garrison, administratrix, Dayton, Ohio, and James O. Garrison, Dayton, and David D. Walker, Chagrin Falls, Ohio, assignors to Garrison Machine Works, Inc., Dayton, Ohio, a corporation of Ohio
Filed Jan. 6, 1960, Ser. No. 905
21 Claims. (Cl. 279—106)

This invention relates to work holding devices of the kind used to locate and to clamp unfinished work pieces for the performing of machining and like operations thereon.

The object of the invention is to simplify the construction as well as the means and mode of operation of work holding devices, whereby such devices may not only be economically manufactured, but will be more efficient and satisfactory in use, adaptable to a wide variety of applications, and be unlikely to get out of order.

A further object of the invention is to present a universal work holder or chuck having especial application as a holder of gears but useful also and without modification to the chucking of non-gear parts which are round, out of round or irregular in shape.

Another object of the invention is to utilize a principle of chucking by controlled pressure, the clamping pressure being applied as a function independent of the size of the work piece and in degrees varying from a light gripping to a pressure sufficient to reform work pieces which have become distorted in heat treating or like operations.

A further object of the invention is to make the chuck adjustable to accommodate work pieces of infinitely variable configuration and to provide gauge means whereby the chuck can quickly and accurately be reset to any desired previous setting.

A still further object of the invention is to provide a generally new chuck construction featuring operation of a circumferential series of chuck jaws, relatively adjustable in circular and radial senses, by a common draw bar.

A further object of the invention is to provide a work holding device possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view in perspective of a chuck in accordance with the illustrated embodiment of the invention, the chuck being shown gripping a gear part;

FIG. 2 is a fragmentary view in longitudinal section showing the chuck of FIG. 1 mounted upon a machine tool spindle, the connection there illustrated between the machine operated draw bar and one chuck jaw assembly being identical with respect to the other chuck jaw assemblies;

FIG. 4 is a detail view in perspective of the front of a chuck jaw assembly;

FIG. 5 is a detail view in cross-section of a chuck jaw forming a part of the chuck jaw assembly; and FIG. 6 is a detail view of the front of the chuck jaw of FIG. 5.

Like parts are indicated by similar characters of reference throughout the several views.

Figure 1:
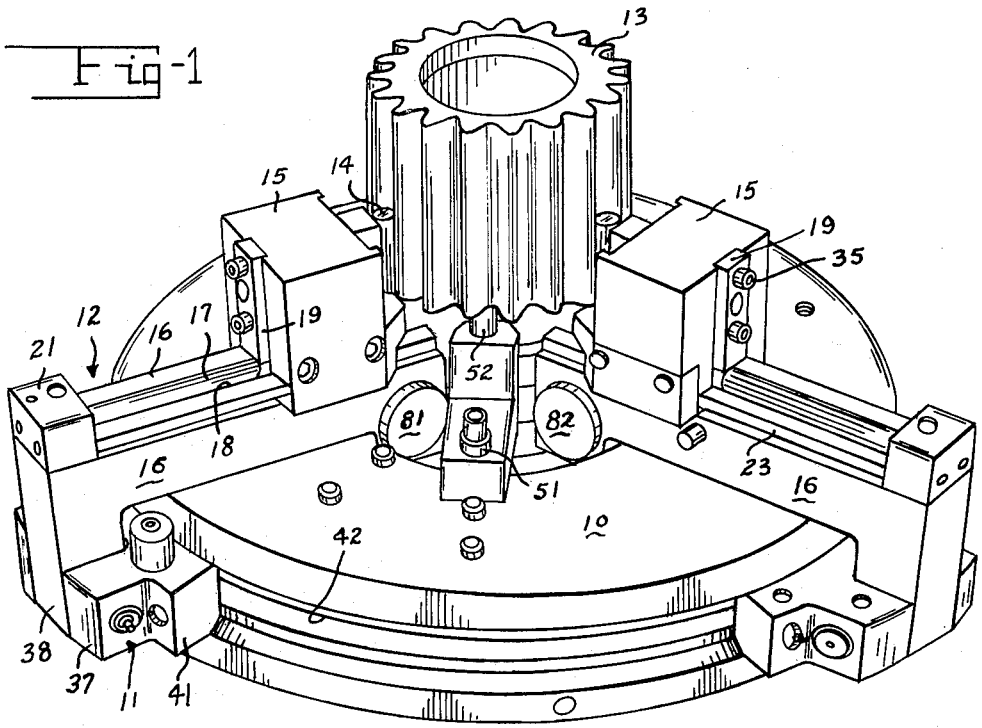

Referring to the drawings, a chuck in accordance with the illustrated embodiment of the invention is a generally unitary device adapted to be mounted on to form a part of a machine tool or, more particularly, in the illustrated instance to be mounted upon a machine tool spindle for rotation therewith. As seen in FIG. 1, the unitary chuck device comprises a circular body 10 having mounts 11 for a circumferential series of jaw assemblies 12. The latter assume gripping and non-gripping or release positions with respect to a centrally positioned work piece 13 which in the illustrated instance is an extremely toothed gear. The chuck jaw assemblies engage the work piece 13 at spaced apart points around the circumference thereof, actual engagement being effected in the instance of each jaw through a loose cylindrical pin 14 received in a space between adjacent teeth on the work piece. Having particular utility in the use of the work holder as a gear chuck, the loose pins 14 reduce direct wear upon the chuck jaws and obviate the need for modifying or substituting complete chuck jaws in adapting the chuck for use with a gear of different tooth spacing.

Also, and as will hereinafter more clearly appear, the mounts 11 for the chuck jaw assemblies 12 are circumferentially adjustable, and the chuck jaws themselves are radially adjustable, to accommodate work pieces of differing shapes and sizes. Thus each jaw assembly is circumferentially adjustable relative to the body 10 and to the other jaw assemblies whereby an equidistant spacing of the jaw assemblies may be retained through any of the 360 degrees of movement or individual jaw assemblies may be circumferentially offset in an infinitely variable manner, all in accordance with the requirements of the work piece. Also, jaw elements 15, which together with arms 16 make up the jaw assemblies, are radially adjustable to an infinite number of positions along their respective supporting arms in order that whatever may be the size or shape of the work piece it can be achieved by and clamped between the chuck jaws. A means operating positively to hold a chuck jaw 15 in a set position of adjustment, against applied clamping pressure, is represented by a gauge rod 17 which lies in a longitudinal groove 18 in the upper surface of each arm 16, the rod engaging at its ends accurately positioned abutment members 19 and 21 on the jaw 15 and arm 16 respectively. Reposing normally by gravity in their respective grooves 18 the rods 17 define a correct position of radial adjustment for the chuck jaws with respect to a particular work piece. Accordingly the setting up or the adapting of the chuck for gripping of a known or previously encountered work piece involves merely the selection of previously prepared gauge rods and their insertion into the grooves 18 following which the chuck jaw is drawn up against the adjacent end of the gauge rod and thereby automatically assumes its correct chucking position.

The chuck jaw elements 15 are held from lateral motion relative to their respective arms by virtue of a slot 22 with undercut sidewalls extending longitudinally along the bottom of each jaw member and which, together with a mating rail 23 on the upper surface of each arm 16, defines a sliding dove-tail joint. The groove 22 is in part formed by a detachable portion 24 of the chuck jaw, the portion 24 having the character of a clamp which when held tightly to the rail 22 becomes a part of the chuck jaw and assists in holding the jaw firmly to a seat on the arm 16. Released to a non-clamping position, however, the portion 24 frees the jaw for motion along the arm. Bolts 25 provide the means for adjusting the portion 24 to clamping and releasing positions. Clamped to the arm 16 the jaw 15 frictionally is held from movement toward the work, as well as being positively limited in motion away from the work.

With further respect to the work engaging jaws 15, that side of each jaw opposite the one mounting abutment member 19 is the one presented to the work. In the lower part of such other face is a horizontal ledge 26 providing a rest for the interposed pin 14. Above the ledge 26 lateral margins 27 of the jaw 15 define a recessed surface 28 through which opens a longitudinal bore 29. Received in the bore 29 is a stem 31 projecting rearwardly from a holding pad 32 on the front face of which is installed a hardened, wear resistant insert element 33. The outwardly disposed face of insert device 33 is radiused or curved in a longitudinal sense in order that a smooth hard surface will be presented for contact with the work despite variations in size and configuration of the work piece. It will be understood, in this latter connection, that the chuck jaws are adapted for direct engagement with the work and do not necessarily make contact through an interposed pin 14.

The holder 32 is drawn to a seat on surface 28 by a bolt 34 entering the bore 29 from the back or reverse side of the chuck jaw. Shown in FIGS. 1, 2 and 5 in a vertical position, the holder 32 is so adjusted due to the requirements of the work piece which presents teeth that are parallel to its longitudinal axis. The holder is, however, angularly adjustable from the vertical, as for example to a position as shown in FIG. 6, in order that it may be accommodated to different work requirements such as the angle of a helical gear. By loosening the bolt 34 the holder 32 may be adjusted to any desired angular position and the bolt then tightened to lock the holder in its set position. The bolt 34 is overlaid by the previously mentioned abutment plate 19 which is detachably held to the chuck jaw by screw studs 35 and which is formed at its lower end with a machined surface 36 for contact with the gauge rod 17.

The circumferential positioning of the chuck jaw assembly 12 is accomplished as noted through adjustment of the mounts 11. Each mount 11 has, as seen, a bifurcated portion 37 receiving a downwardly extending finger 38 on what may be considered to be the outer end of the arm 16. A transverse stud 39 provides a pivotal mounting for the arm 16 within bifurcated portion 37. The mount itself is slidably mounted on the periphery of the body 10, the mount having an arcuately shaped portion 41 seated in a peripheral groove 42 in the body. Inwardly of the groove 42 the periphery of the body 10 further is formed with an additional groove 43 connected to the groove 42 by a circumferential slot 44. Projecting radially through the arcuate portion 41 of each mount, on opposite sides of the bifurcated portion 37, are screw studs 45 which project through the slot 44 and into the groove 43 where they have respective engagement with a nut 46. Adjustment of the screw stud 45, it will be understood, has the effect of tightening and loosening the mount 11 upon its seat in groove 42. Loosened, the mount and jaw assembly carried thereby is freely slidable on the periphery of the body 10 and can be variably positioned on the body in a circumferential sense. Tightened, the mount is secured to the body and so maintains the jaw assembly in a set position of adjustment.

As an aid to precise positioning of the jaw assemblies the body and the jaw assemblies may be suitably marked to provide a graduated scale which may bear a relation to the character of the work but in any event provides a means for resetting the chuck jaw assemblies to a previously found position. Thus in the case of gear chucking the graduations may indicate the number of teeth on the gear to be chucked so that positioning of the chuck jaw assemblies to a certain graduation number will correctly position the jaws to engage a gear part having teeth of corresponding number. It will further be understood that while all of the several jaw assemblies have been here disclosed as individually adjustable upon the body, provision may be made for one or more of the jaw assemblies to be stationarily mounted and of course it is within the concept of the invention that all of the jaw assemblies occupy circumferential positions upon the body fixed relative thereto.

Referring to FIG. 2 of the drawing, the unitary chuck device as described is adapted to be mounted upon a spindle 47 of a machine tool or the like and having a through longitudinal opening 48. The body 10 is mounted on the spindle 47 to present an outwardly facing planar surface 49. The arms 16 of the jaw assemblies 12 extends radially inward over the surface 49 and have their inner end terminating near the axis of the spindle 47. Mounted on the surface 49 in alternating relation to the chuck jaw assemblies 12 is a circumferential series of supports 51 presenting upwardly extending studs 52 serving as rests for the work piece 13. The supports 51 are suitably mounted on the body 10 for adjustment suiting the support requirements of the work piece. The body 10 has a through longitudinal opening 53, the lower or inner end of which is tapered to interfit with a mating projection 54 on the spindle 47. The body 10 is in this manner centered upon the spindle 47 and is held in such position by bolts 55, the heads of which are recessed in an annular groove 56 in the body.

There is mounted in the bore 48 of the spindle 47 a bushing 57 having a flange 58 at its upper end received in a counter bore 59 in the body 10 and resting on the projection 54. Bolts 61 hold the bushing 57 to the spindle 47 and serve also to hold in place a flexible dirt seal 62. The latter overlies the upper end of the bushing 57 and the upper end of a sleeve 63 reciprocably mounted in the bushing 57 and forming part of a draw bar which, as a part of a remotely controlled machine operation, is movable alternately downward and upward as viewed in FIG. 2 relative to spindle 47 and body 10 of the chuck.

Reciprocable motion of the draw bar is utilized to effect movement of the chuck jaw assemblies 12 to gripping and releasing positions relative to the work piece 13. A draw bar comprises, in addition to the sleeve 63, a head portion 64 comprised of a cylindrical base 65 adapted to seat upon the upper end of bushing 57 and sleeve 63, and further comprises a cap 66 overlying the cylindrical portion 65 and spaced therefrom by a shank 67 projecting centrally from the base portion 65. The portion 65 and cap 66 have longitudinal through openings and a stud 68 extends longitudinally therethrough and into the open upper end of sleeve 63 with which it has a threaded connection. A head 69 on the stud 68 is recessed into the upper surface of cap 66 and when the stud is turned down into the sleeve 63 it serves to clamp the parts 65 and 66 to one another and to the sleeve 63. Thus, sleeve 63, head 64 and stud 68 comprise a unitary draw bar assembly.

The upper surface of head portion 65 is undercut to define a sloping surface 71. The lower surface of cap 66 similarly is undercut to define a surface 72, these surfaces cooperating with the exterior of shank 67 to define a dovetail type of annular groove 73. Received in the groove 73 is a plurality of arcuate plates 74 shaped with upper and lower surfaces mating with the groove surfaces 71 and 72 in such manner as to be interlocked within the dovetail groove 73. One plate 74 is provided for each jaw assembly 12 and the arcuate length of each plate is less than 120° whereby each plate is capable of limited circumferential motion relative to the others.

Figure 3:
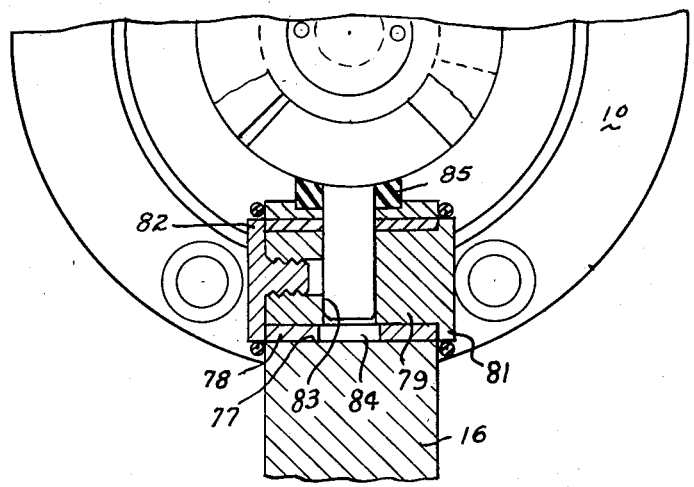
FIG. 3 is a detail view, partly broken away, taken in horizontal section substantially along the line 3—3 of FIG. 2.

Projecting radially from each plate 74 outside the groove 73 is an integral stud 75. The studs 75 are aligned with the inner ends of respective jaw arms 16 and extend through laterally elongated openings 76 in respective arms into transverse cylindrical bores 11 therein. A bushing 78 (FIG. 3) is received in each bore 77 and there is mounted in the bushing 78 a cylinder 79. The latter has at one end thereof an integral head 81 limiting against one end of the bushing 78. At the opposite end of the cylinder is a detachable cap 82 engaging the opposite end of the bushing and suitably connected as by a screw stud to the cylinder to form normally a part thereof. The cylinder 79 has a transverse through opening 83 registering with a similar opening 84 in the bushing 78. The stud 75 projects through one side of the bushing 78 and into bore 83 in the cylinder 79. As may be seen, there is thus established between the head of the draw bar and individual draw assemblies 12 a jointed connection whereby longitudinal motion of the draw bar effects a raising and lowering of the inner ends of the chuck jaw assemblies such motion being permitted by reason of the pivotal connection of the assemblies to their respective mounts 1. The rocking motion of the chuck jaw assemblies as compared to the fixed longitudinal path of the draw bar requires an accommodation in the connections which is achieved by sliding motion of the stud 75 and rotary adjustment of the cylinnder 79. Gasket means 85 is located in the opening 76 to restrict the entrance of dirt into bore 77.

A motion axially upward of the draw bar serves to raise the inner ends of the chuck jaw assemblies so that the jaws 15 thereof move upward and away from the work piece. This accordingly is a motion of release relative to the work piece. A downward motion of the jaw bar rocks the jaw assemblies downward and inward and hence initiates a gripping or chucking action. The several jaw assemblies are directly responsive to the draw bar and, moreover, move in correspondence with the movement of the draw bar. Hence, the pressure with which the jaws engage the work is a function of the operating pressure applied upon the draw bar. This pressure or pull, variable at the will of the operator, may thus be applied in a wide range between that sufficient lightly to grip the work and that of such greater pressure as to reform previously deformed articles. Further, the size of the work piece is without effect upon the applied gripping pressure which can be varied as described irrespective of work piece size.

It will be understood that the structure of the chuck is susceptible of conventional modifications, as for example by reversing the chuck jaws to grip an internal surface of a work piece, in which case the movements of the draw bar to effect gripping and release of the work piece would be reversed from those described. Also, the jointed connection between the head of the draw bar and the chuck jaw assemblies places the cylinder 79 in the arm 16 of the chuck jaw assembly. A reverse arrangement of parts, anchoring the stud in the end of the chuck jaw arm and placing the rotatable cylinder in the head of the draw bar is likewise contemplated.

Still further in the operation of the chuck it will be understood that while the arcuate plates 74 are normally clamped within the groove 73 they may be released for circumferential adjustment with the chuck jaw assemblies by a backing off of the stud 68 to release the clamping pressure applied by cap 66.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A chuck, including a chuck body having a longitudinal through opening therein, rest means on one face of said body to support a work piece over said longitudinal through opening, arms mounted on said body to overlie said one face thereof and pivotally connected to said body for rocking motion in respective radial planes, a longitudinally reciprocable draw bar extending through said opening in said body and connected to said arms to effect rocking motion thereof, and work piece engaging jaws on said arms.

2. A chuck according to claim 1, characterized in that said jaws are mounted on said arms for radial adjustment thereon relative to said longitudinal through opening.

3. A chuck according to claim 1, characterized in that said arms are mounted on said body for relative circumferential adjustment.

4. A chuck, including a chuck body, a plurality of circumferentially spaced apart arms arranged in individual radial planes over one face of said body, said arms being pivotally connected to said body for relative rocking motion in said radial planes, said body having a longitudinal through opening radially inward of the inner ends of the arms, a longitudinally reciprocable draw bar extending through said opening and connected to the inner ends of said arms to effect rocking motion of said arms, and chuck jaws on said arms movable radially in a converging direction in response to motion of said draw bar in one direction and movable in a reverse sense in response to motion of said draw bar in the opposite direction.

5. A chuck, including a chuck body having a through longitudinal opening and on one side thereof a surface at right angles to the axis of said through opening, a circumferential series of arms overlying said surface in respective planes radial to the axis of said through opening, said arms being pivotally connected to said body for rocking motion in said respective planes, chuck jaws on said arms movable in convergent and divergent senses in response to rocking of said arms, and a reciprocable draw bar entering said opening from the opposite side of said body and extending through said opening, said draw bar being connected to said arms to achieve a rocking motion thereof in response to longitudinal motion of said bar.

6. A chuck, including a chuck body having a through opening therein, a reciprocable draw bar extending into said opening from one side of said body and projecting through said opening to the other side of the body, support means for a work piece on said other side of the body, a circumferential series of chuck jaws in concentric relation to said draw bar on the said other side of the body, individual means suporting said chuck jaws and individually connected to said body for relative rocking motion in respective planes radial to said draw bar, a connection between said draw bar and said last named means utilizing reciprocating motion of said draw bar correspondingly to rock said jaws in convergent and divergent senses, and means for supporting a work piece for gripping by said jaws, the pressure of contact upon the work piece being directly related to the axial thrust of said draw bar.

7. A chuck, including a chuck body, a circumferential series of arms radially disposed on one side of said body and having outer ends pivotally connected to the body, a reciprocable draw bar in generally perpendicular relation to said arms centrally of said series, said draw bar being connected to the inner ends of said arms to achieve a rocking motion of the arms in response to longitudinal motion of the draw bar, and chuck jaws on said arms.

8. A chuck according to claim 7 wherein said chuck jaws are selectively adjustable longitudinally of said arms, characterized by gauge rods removably installed in said arms positively limiting motion of said jaws along said arms in one direction.

9. A chuck according to claim 7 wherein said arms are adapted to receive gauge rods of different length, said rods being selected in accordance with the dimensions of the work piece to be chucked.

10. A chuck according to claim 7, characterized in that said arms are mounted on said body for relative circumferential adjustment, the connection between said draw bar and the inner ends of said arms affording such adjustment.

11. A chuck, including a chuck body, a circumferential series of arms radially disposed on one side of said body and pivotally connected outwardly of their inner ends to said body for rocking motion in respective radial planes, means having a common connection with the inner ends of said arms reciprocable to rock said arms, a chuck jaw slidably mounted on each of said arms, and gauge means holding said chuck jaw in a predetermined set position of adjustment on the arm.

12. A chuck, including a chuck body, a circumferential series of arms radially disposed on one side of said body and pivotally connected outwardly of their inner ends to said body for rocking motion in respective radial planes, reciprocable means centrally of said series of arms, a connection between said reciprocable means and the inner end of each of said arms raising and lowering the said inner end of each of said arms in response to reciprocation of said reciprocable means, said connection including pivotal means accommodating rocking movement of the arm, and a chuck jaw on each of said arms.

13. A chuck according to claim 12, characterized in that said connection between said reciprocable means and each of said arms comprises cooperating parts in the form of an interengaged stud and swivel.

14. A chuck, including a chuck body, a circumferential series of arms approximately radially disposed on said body and having inner ends extending toward the longitudinal axis of said body, said arms being connected to said body outwardly of the inner ends thereof for rocking motion in respective radial planes, a draw bar disposed on the longitudinal axis of said body, an annular groove in said draw bar, means including a stud extending between said groove and the inner end of each of said arms effecting rocking motion of said arms in response to reciprocable motion of said draw bar, and chuck jaws on said arm.

15. A chuck according to claim 14, characterized by an adjustable mounting for said arms on said body providing for selective circumferential positioning of the arms, circular motion of the inner ends of the arms being accommodated in the annular groove in said draw bar.

16. A universal chuck, including a chuck body, a circumferential series of chuck jaw assemblies extending in an approximately radial fashion across one face of said body, a draw bar disposed centrally of said series and perpendicular thereto, individual mounts for said chuck jaw assemblies supported on said body for rotary sliding movement about said draw bar, said chuck assemblies being connected to said mounts for relative rocking motion in respective radial planes, a connection between each chuck jaw assembly and said draw bar effecting a rocking motion of said chuck jaw assemblies in response to longitudinal motion of said draw bar, said connection including an annular groove in said draw bar enabling relative rotary adjustment of said chuck jaw assemblies.

17. A universal chuck according to claim 16, characterized by releasable means anchoring said chuck assemblies to said body and to said draw bar in any rotary position of adjustment thereof.

18. A chuck jaw assembly, including an arm, a jaw slidably mounted on said arm, gauge means positively to position said jaw on said arm, and hardened insert means in a face of said chuck jaw curved to present a smooth adaptable surface to the work, said insert means being adjustable in said jaw in a rotary sense.

19. A gear chuck assembly including a jaw, means supporting the jaw with one surface of said jaw facing the work, said one surface of the jaw being formed with a ledge, and a pin adapted to be received between adjacent gear teeth mounted on end on said ledge.

20. A chuck, including a chuck body, a circumferential series of arms radially disposed on one side of said body and pivotally connected outwardly of their inner ends to said body for rocking motion in respective radial planes, means having a common connection with the inner ends of said arms reciprocable to rock said arms to and from said one side of said body, a chuck jaw slidably mounted on each of said arms for adjustment to and from its inner end, means for holding said jaws in predetermined set positions on said arms and insert means on the holding faces of said chuck jaws adjustable to selected positions thereon to suit the contour of the work piece to be applied.

21. A chuck, including a chuck body, a circumferential series of arms radially disposed on one side of said body and pivotally connected outwardly of their inner ends to said body for rocking motion in respective radial planes, means connected with the inner ends of said arms reciprocable to conjointly rock said arms to and from said one side of said body, a chuck jaw slidably mounted on each of said arms for movement to and from the inner end thereof, means for holding said jaws in predetermined set positions on said arms, and said chuck jaws including means for holding a pin in projected relation to their work holding faces whereby to enable their application to work pieces having peripherally projected tooth-like elements with varied spacing.

References Cited in the file of this patent

UNITED STATES PATENTS

| | | |
|---|---|---|
| 1,036,994 | Garvin | Aug. 27, 1912 |
| 2,448,881 | Glynn | Sept. 7, 1948 |
| 2,491,611 | Hohwart et al. | Dec. 20, 1949 |
| 2,691,531 | Grobey | Oct. 12, 1954 |
| 2,832,601 | Mann | Apr. 29, 1958 |
| 2,879,070 | Garrison | Mar. 24, 1959 |